United States Patent Office 3,258,472
Patented June 28, 1966

3,258,472
$\Delta^{1(10),5}$-19-NOR-ANDROSTADIENES AND PROCESS THEREFOR
Albert Bowers and Otto Halpern, Mexico City, Mexico, assignors to Syntex Corporation, Panama, Panama, a corporation of Panama
No Drawing. Filed July 9, 1963, Ser. No. 293,898
Claims priority, application Mexico, Mar. 14, 1963, 71,259
24 Claims. (Cl. 260—397.4)

The present invention relates to certain novel cyclopentanoperhydrophenanthrene derivatives and to the method for the production thereof.

More particularly it relates to the novel $\Delta^{1(10),5}$-19-norandrostane derivatives and to a process for preparing $\Delta^{1(10),5}$-19-nor steroids.

The novel compounds of the present invention are represented by the following formulas:

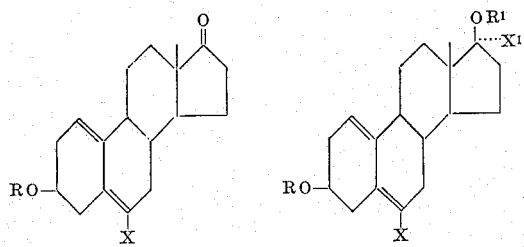

In the above formulas R and $R^1$ represent hydrogen or an acyl radical of less than 12 carbon atoms, and X and $X^1$ represent hydrogen or a hydrocarbon radical (alkyl, alkenyl or alkinyl) of less than 8 carbon atoms.

The acyl groups above referred to are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and $\beta$-chloropropionate.

The novel compound object of the present invention are potent anabolic agents with a favorable anabolic-androgenic ratio. They also have estrogenic, anti-gonadotrophic and anti-fibrillatory properties, lower the blood cholesterol level and inhibit the activity of the pituitary gland.

These compounds are also useful as intermediates for the synthesis of ring A aromatic and 19-nor steroids.

The process for the production of $\Delta^{1(10),5}$-19-nor steroids, which is one of the objects of the present invention is represented by the following sequence of reactions:

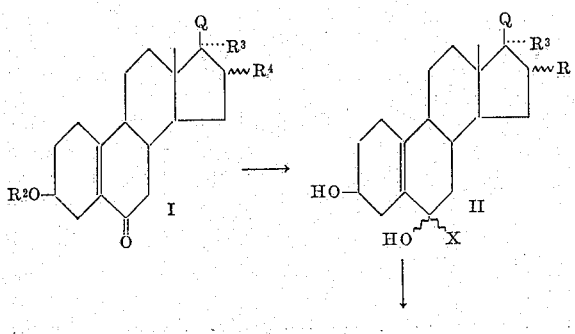

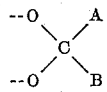

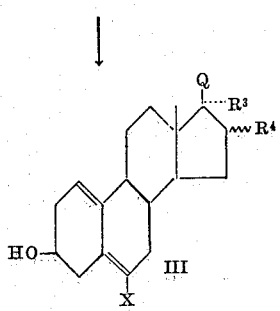

In the preceding formulas X has the same meaning as heretofore indicated; $R^2$ represents an acyl radical of less than 12 carbon atoms; Q represents an acyloxy group or a keto group (androstane series) protected in the starting materials by the formation of cycloalkylenedioxy derivative; an acetyl group protected in the starting materials as the cycloalkylenedioxy derivatives (pregnane series), the dihydroxy acetone side chain protected by formation of the bismethylenedioxy derivatives or the sapogenin side chain.

In the pregnane derivatives, $R^3$ represents hydrogen, hydroxy or an acyloxy radical; $R^4$ represents hydrogen, $\alpha$-methyl, $\beta$-methyl, $\alpha$-hydroxy or $\alpha$-acyloxy; $R^3$ and $R^4$ together represent the grouping $$\begin{array}{c}-O\diagdown\phantom{C}\diagup A\\ \phantom{-O}C\\ -O\diagup\phantom{C}\diagdown B\end{array}$$

wherein A represents hydrogen or a lower alkyl radical and B represents a lower alkyl, aryl or aralkyl radical of up to 8 carbon atoms.

The starting materials (I) are obtained by oxidation of a 3-acyloxy-19-hydroxy-$\Delta^5$-compound with chromium trioxide in pyridine in accordance with the method described in our copending application Serial No. 293,891, filed July 9, 1963.

By reaction of a 3-acyloxy-$\Delta^{5(10)}$-19-nor-6-keto steroid (I) with a double metal hydride, preferably with lithium aluminum hydride in tetrahydrofurane solution at reflux temperature, the acyloxy group at C–3 is saponified and the keto group reduced, thus affording the 3,6-dihydroxy compounds (mixture of $6\alpha$ and $6\beta$ isomers) (II, X=H).

Alternatively, if said starting materials are reacted with an alkyl, alkenyl or alkinyl magnesium halide, at reflux temperature and for a period of time in the order of 2 to 6 hours, a hydrocarbon radical is introduced at C–6 and the acyloxy group at C–3 is saponified simultaneously, thus yielding the 3,6-dihydroxy-6-alkyl, alkenyl or alkinyl derivatives (mixture of $6\alpha$, and $6\beta$ isomers) (II, X=alkyl, alkenyl or alkinyl).

This transformation may also be achieved by using an alkyl lithium or the sodium or potassium salt of a lower alkine, by methods well known in the art.

By treatment of the $\Delta^{5(10)}$-3,6-dihydroxy compounds (II) with a proton donor, preferably with an acid, such as aqueous acetic acid, using preferentially 50% acetic acid, for a period of time of between 30 minutes and 4 hours, there are produced the 3-hydroxy-$\Delta^{1(10),5}$-19-norandrostadienes and pregnadienes (III). When the starting materials used possess an alkylenedioxy group at C–17 or C–20, this group is also hydrolyzed, to afford the respective C–17 or C–20 keto derivatives.

Alternatively, a strong acid may be used instead of aqueous acetic acid, such as for example hydrochloric acid, sulfuric acid, perchloric acid, p-toluenesulfonic acid, trichloroacetic acid, etc., in a solvent inert to the reaction at room temperature for a period of time in the order of 10 minutes to 5 hours.

Adequate solvents for this reaction are diethylether, isopropylether, tetrahydrofurane, dioxane, Dowanol, etc., in general, any ethereal solvent.

As examples of suitable starting materials for the process object of the present invention there are the diacetate of $\Delta^{5(10)}$-19-nor-androstene-3β,17β-diol-6-one; 3-acetoxy-17 - ethylenedioxy-$\Delta^{5(10)}$-19-nor-androsten-6-one; 3-acetoxy - 20-ethylenedioxy-$\Delta^{5(10)}$-19-nor-pregnen-6-one; 3-acetoxy - 20-ethylenedioxy-$\Delta^{5(10)}$-19-nor-pregnen-17α-ol-6-one; 3,17-diacetoxy-20-ethylenedioxy-$\Delta^{5(10)}$-19-nor-pregnen-6-one; 16α-methyl-3-acetoxy-20-ethylenedioxy-$\Delta^{5(10)}$-19-nor-pregnen-6-one; 16β-methyl-3-acetoxy-20-ethylenedioxy-$\Delta^{5(10)}$-19-nor-pregnen-6-one; 16α-methyl-3-acetoxy-20-ethylenedioxy-$\Delta^{5(10)}$-19-nor-pregnen-17α-ol-6-one; 16β-methyl - 3-acetoxy-20-ethylenedioxy$\Delta^{5(10)}$-19-nor-pregnen-17α - ol-6-one; 16α,17α-isopropylidenedioxy-20-ethylenedioxy-$\Delta^{5(10)}$-19-nor-pregnen-6-one; 17,20;20,21-bismethylenedioxy - 3 - acetoxy-$\Delta^{5(10)}$-19-nor-pregnen-6-one; 17,20;20,21 - bismethylenedioxy-3-acetoxy-$\Delta^{5(10)}$-19-nor-pregnen-11β-ol-6-one; 17,20;20,21-bismethylenedioxy-3 - acetoxy-$\Delta^{5(10)}$-19-nor-pregnen-6,11-dione; 16α-methyl-17,20:20,21 - bismethylenedioxy-3-acetoxy-$\Delta^{5(10)}$-19-nor-pregnen - 6-one and 16β-methyl-17,20;20,21-bismethylenedioxy-3-acetoxy-$\Delta^{5(10)}$-19-nor-pregnen-6-one.

The novel $\Delta^{1(10),5}$-19-nor-androstadienes object of the present invention are obtained by the method illustrated by the following sequence of reactions:

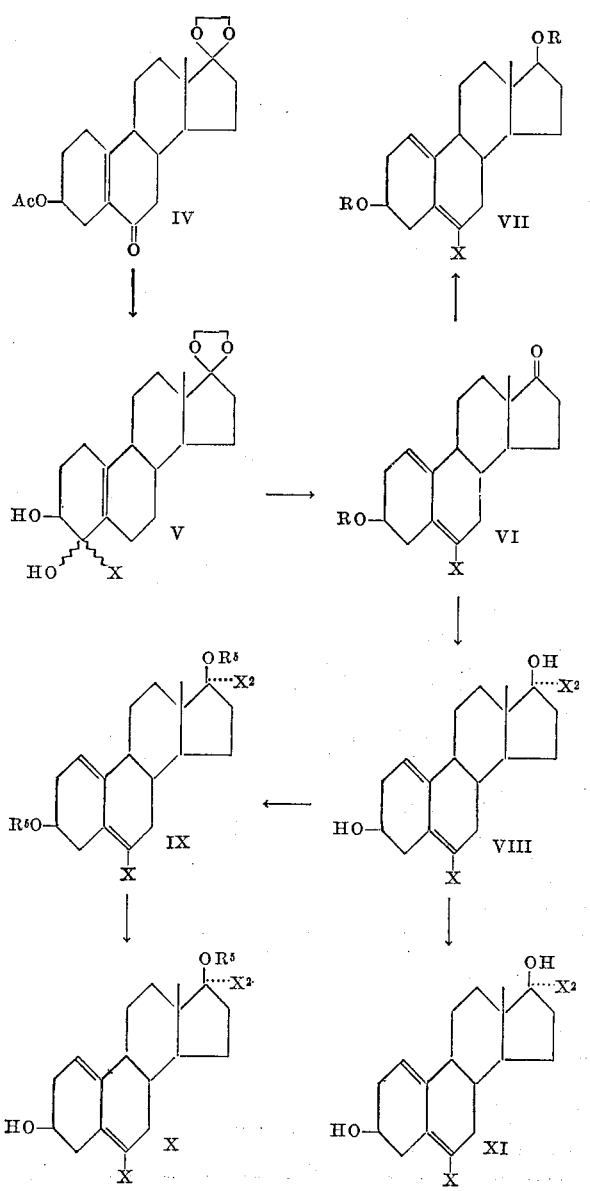

In the above formulas R and X have the meaning hereinbefore indicated, $R^5$ represents an acyl radical of less than 12 carbon atoms, and $X^2$ represents a lower alkyl, alkenyl or alkinyl radical.

In practicing the process illustrated above, 3-acetoxy-17-ethylenedioxy-$\Delta^{5(10)}$-19-nor androsten-6-one (IV), is reduced with a double metal hydride, preferably with lithium aluminum hydride in tetrahydrofurane solution to give rise to the 17-ethylenedioxy $\Delta^{5(10)}$-19-nor-androstene-3β,6-diol (mixture of 6α and 6β-isomers) (V; X=H).

By reaction of the starting compound (IV) with an alkyl, alkenyl or alkinyl magnesium halide, with an alkyl lithium or with a sodium or potassium salt of an alkine, as indicated in detail hereinbefore, there are obtained the 6-alkyl, alkenyl or alkinyl substituted derivatives of 17-ethylenedioxy-$\Delta^{5(10)}$-19-nor-androstene-3β,6-diol (V; X=alkyl, alkenyl or alkinyl).

Upon acid treatment of the foregoing diols (V), such as for example by heating with 50% acetic acid for a period of time of between 30 minutes and 4 hours or with a strong acid, such as for example hydrochloric acid, sulfuric acid, perchloric acid, or p-toluenesulfonic acid in an ether solvent such as for example diethylether, isopropylether, dioxane, tetrahydrofurane, Dowanol, and the like, at room temperature and for a period of time of the order of 10 minutes to 4 hours, there are obtained the 3-hydroxy-17-keto-$\Delta^{1(10),5}$-19-nor-androstadienes (VI; R=H), i.e., $\Delta^{1(10),5}$-19-nor-androstadiene-3β-ol-17-one, 6 - methyl - $\Delta^{1(10),5}$ - 19 - nor-androstadien-3β-ol-17-one, 6-ethyl - $\Delta^{1(10),5}$ - 19-nor-androstadien-3β-ol-17-one, 6-vinyl-$\Delta^{1(10),5}$ - 19 - nor - androstadien - 3β - ol-17-one, 6-ethinyl-$\Delta^{1(10),5}$-19-nor-androstadien-3β-ol-17-one, and other similar compounds. By treatment of these compounds with carboxylic acid anhydrides of less than 12 carbon atoms in pyridine solution, in a conventional manner, there are obtained the respective esters (VI; R=acyl).

By reduction of the 3-hydroxy-17-keto-$\Delta^{1(10),5}$-19-nor-androstadienes with a double metal hydride, such as for example sodium borohydride, in aqueous methanol solution there are obtained $\Delta^{1(10),5}$-19-nor-androstadiene-3β,17β-diol and the 6-alkyl, alkenyl or alkinyl substituted derivatives thereof, (VII; R=H), which are converted into the corresponding diesters by conventional treatment with acid anhydrides or chlorides of less than 12 carbon atoms in pyridine solution (VII; R=acyl).

By reaction of the 3-hydroxy-17-keto-$\Delta^{1(10),5}$-19-nor-androstadienes (VI; R=H) with an alkyl, alkenyl or alkinyl magnesium halide, such as for example with methyl, ethyl, vinyl, ethinyl or propargyl magnesium bromide, there are obtained the 17α-alkyl, alkenyl or alkinyl substituted derivatives (VIII). The introduction of the hydrocarbon substituents at C–17α may be alternatively achieved by using an alkyl lithium or the sodium or potassium salt of a lower alkine.

Treatment of the foregoing compounds (VIII) with carboxylic acid anhydrides of less than 12 carbon atoms in benzene solution and in the presence of an acid catalyst, such as p-toluenesulfonic acid yields the 3-17-diesters (IX), which upon selected hydrolysis, preferably by reaction with potassium carbonate or dilute potassium hydroxide in methanol solution, at low temperature, give rise to the 17-monoesters (X).

The esterification of the compounds represented by VIII with acid anhydrides or chlorides of the type hereinbefore indicated, in pyridine and at room temperature, produce the 3-monoesters (XI).

There may be obtained compounds esterified at C–3 and C–17 by different carboxylic acids, by reesterification of (X) in pyridine solution, or by reesterification of (XI) in benzene solution and in the presence of p-toluenesulfonic acid.

The novel $\Delta^{1(10),5}$-19-nor-androstadiene-3β,17β-diol and its 6-substituted derivatives (VIII, R=H) may also be obtained from the diacetate of $\Delta^{5(10)}$-19-nor androstene-3β,17β-diol-6-one by reduction with lithium aluminum anhydride or treatment with an alkyl, alkenyl or alkinyl magnesium halide followed by acid treatment.

The following examples serve to illustrate the present invention but are not intended to limit its scope.

PREPARATION 1

A mixture of 5 g. of the 3-acetate of $\Delta^5$-androstene-3$\beta$,19-diol-17-one, 75 cc. of 2-methyl, 2-ethyl-1,3-dioxolane and 200 mg. of p-toluenesulfonic acid was heated to boiling and refluxed with distillation for 1 hour. The mixture was cooled, diluted with water, extracted with ethyl acetate and the organic extract washed to neutral, dried and evaporated to dryness. Crystallization from acetone-hexane afforded 3-acetoxy-17-ethylenedioxy-$\Delta^5$-androsten-19-ol.

A solution of 5 g. of the preceding compound in 60 cc. of pyridine was added to a mixture of 5 g. of chromium trioxide in 60 cc. of pyridine. The reaction mixture was kept at room temperature for one week. At the end of this time it was diluted with ethyl acetate, filtered through celite and the filtrate was washed well with water, and evaporated to dryness. Crystallization from acetone - hexane produced 3-acetoxy - 17 - ethylenedioxy-$\Delta^{5(10)}$-19-nor-androsten-6-one.

In the same manner, starting from the 3-monoacetate of $\Delta^5$-pregnene-3$\beta$,19-diol-20-one, 3-monoacetate of 16$\alpha$-methyl-$\Delta^5$-pregnene-3$\beta$,19-diol-20-one, 3 - monoacetate of 16$\alpha$,17$\alpha$-isopropylidenedioxy-$\Delta^5$-pregnene-3$\beta$,19 - diol - 20-one and the 3,17-diacetate of $\Delta^5$-pregnene-3$\beta$,17$\alpha$,19-triol-20-one there were obtained as final products: 3-acetoxy-20-ethylenedioxy-$\Delta^{5(10)}$-19-nor-pregnen-6-one, 16$\alpha$-methyl-3-acetoxy-20-ethylenedioxy-$\Delta^{5(10)}$-19-nor-pregnen - 6 - one, 16$\alpha$,17$\alpha$-isopropylidenedioxy-3-acetoxy-20-ethylene-dioxy-$\Delta^{5(10)}$-19-nor-pregnen-6-one and 3,17-diacetoxy-20-ethylenedioxy-$\Delta^{5(10)}$-19-nor-pregnen-6-one.

*Example I*

A solution of 5 g. of the diacetate of -$\Delta^{5(10)}$-19-nor-androstene-3$\beta$,17$\beta$-diol-6-one in 150 cc. of anhydrous tetrahydrofuran was added over a 30 minutes period to a stirred suspension of 3 g. of lithium aluminum hydride in 150 cc. of anhydrous tetrahydrofuran. The mixture was refluxed for 2 hours, cooled and carefully treated with 15 cc. of ethyl acetate and 10 cc. of water. Solid sodium sulfate was added, the inorganic material filtered off and washed several times with hot ethyl acetate. The combined organic solutions were evaporated to dryness to produce $\Delta^{5(10)}$-19-nor-androstene-3$\beta$,6,17$\beta$-triol (mixture of 6$\alpha$ and 6$\beta$-isomers), which was used for the next step without further purification.

A mixture of 4.5 g. of the foregoing crude triol and 100 cc. of 50% acetic acid was heated on the steam bath for 30 minutes, poured into water and the formed precipitate collected by filtration, thus obtaining $\Delta^{1(10),5}$-19-nor-androstadiene-3$\beta$,17$\beta$-diol.

*Example II*

In accordance with the method described in the preceding example, 5 g. of 3-acetoxy-17-ethylenedioxy-$\Delta^{5(10)}$-19-nor-androsten-6-one were reduced with lithium aluminum hydride and the 3,6-diol thus obtained treated with 50% aqueous acetic acid (3 hours on the steam bath) to produce $\Delta^{1(10),5}$-19-nor-androstadien-3$\beta$-ol-17-one.

A mixture of 1 g. of the foregoing compound, 4 cc. of pyridine and 4 cc. of acetic anhydride was kept at room temperature for 4 hours, poured into ice water and formed precipitate was filtered off, washed with water and dried. Crystallization from acetone-hexane gave the acetate of $\Delta^{1(10),5}$-19-nor-androstadien-3$\beta$-ol-17-one.

*Example III*

A solution of 3 g. of $\Delta^{5(10)}$-19-nor-androstene-3$\beta$,6,17$\beta$-triol in 60 cc. of tetrahydrofuran and 7 cc. of an 8% aqueous sulfuric acid solution was kept at room temperature for 40 minutes. It was then neutralized with a saturated solution of sodium carbonate, concentrated to approximately 10 cc. under vacuo, and poured into water. The formed precipitate was separated by filtration and carefully washed with water. Crystallization from acetone gave $\Delta^{1(10),5}$-19-nor-androstadiene - 3$\beta$,17$\beta$ - diol, identical to that obtained in Example I.

*Example IV*

The preceding example was repeated but using dioxane as solvent, to afford the same product in similar yield.

*Example V*

A solution of 500 mg. of 17-ethylenedioxy-$\Delta^{5(10)}$-19-nor-androstene-3$\beta$,6-diol in 30 cc. of dioxane was treated with 50 mg. of p-toluenesulfonic acid and the reaction mixture was kept at room temperature for 2 hours. It was poured into ice water, extracted with ethyl acetate and the organic extract washed with water to neutral, dried and evaporated to dryness. Upon addition of ether there was obtained $\Delta^{1(10),5}$-19-nor-androstadien-3$\beta$-ol-17-one, identical to the product obtained in Example II.

*Example VI*

The preceding example was repeated but using Dowanol as solvent, to produce also $\Delta^{1(10),5}$-19-nor-androstadien-3$\beta$-ol-17-one.

*Example VII*

To a solution of 1 g. of $\Delta^{5(10)}$-19-nor-androstene-3$\beta$,6,17$\beta$-triol in 40 cc. of dioxane there were added 0.2 cc. of 72% perchloric acid and the mixture kept for 30 minutes at room temperature; it was diluted with water and extracted with methylene chloride, the organic extract was washed with water, 5% sodium bicarbonate solution and water to neutral, dried over anhydrous sodium sulfate and evaporated to dryness. The residue was crystallized from acetone hexane, to produce $\Delta^{1(10),5}$-19-nor-androstadiene-3$\beta$,17$\beta$-diol, identical to that obtained in the foregoing examples.

*Example VIII*

A solution of 1 g.. of 17-ethylenedioxy-$\Delta^{5(10)}$-19-nor-androstene-3$\beta$,6-diol in 50 cc. of ether was treated with 50 cc. of a saturated solution of perchloric acid in ether, and the mixture kept at room temperature for 30 minutes. The solution was then washed with 5% sodium bicarbonate solution and water, dried over sodium sulfate and evaporated to dryness.

Addition of ether gave $\Delta^{1(10),5}$-19-nor-androstadien-3$\beta$-ol-17-one.

*Example IX*

A solution of 2 g. of $\Delta^{1(10),5}$-19-nor-androstadien-3$\beta$-ol-17-one in 100 cc. of benzene, thiophene-free was treated with 12 cc. of 4 N methyl magnesium bromide in ether, and the mixture refluxed for 3 hours with the exclusion of moisture. The cooled mixture was carefully treated with an excess of an aqueous ammonium chloride solution and the product isolated by extraction with ethyl acetate. The extract was washed with water, dried over anhydrous sodium sulfate and evaporated to dryness.

Crystallization from methylene chloridehexane gave 17$\alpha$-methyl-$\Delta^{1(10),5}$-19-nor-androstadiene-3$\beta$,17$\beta$-diol.

In a similar manner but using ethyl, propyl, vinyl and ethinyl magnesium bromide instead of methyl magnesium bromide there were obtained 17$\alpha$-ethyl-$\Delta^{1(10),5}$-19-nor-androstadiene-3$\beta$,17$\beta$ - diol, 17$\alpha$ - propyl-$\Delta^{1(10),5}$-19-nor-androstadiene - 3$\beta$,17$\beta$ - diol, 17$\alpha$-vinyl-$\Delta^{1(10),5}$-19-nor-androstadiene-3$\beta$,17$\beta$-diol and 17$\alpha$-ethinyl-$\Delta^{1(10),5}$-19-nor-androstadiene-3$\beta$,17$\beta$-diol.

*Example X*

In accordance with the method described in the preceding example, 5 g. of 3-acetoxy-17-ethylenedioxy-$\Delta^{5(10)}$-19-nor-androsten-6-one were treated with methyl magnesium bromide to produce 17-ethylenedioxy-6-methyl-$\Delta^{5(10)}$-19-nor-androstene-3$\beta$,6-diol (mixture of $\alpha$- and $\beta$-isomers at C–6).

To a solution of 3 g. of the foregoing compound in 45 cc. of dioxane there was added 0.6 cc. of concentrated hydrochloric acid and the mixture was kept for 1 hour at room temperature. It was poured into water, extracted with methylene chloride and the organic extract washed with water to neutral, dried over anhydrous sodium sulfate and evaporated to dryness. Crystallization from acetone-hexane gave 6-methyl-$\Delta^{1(10),5}$-19-nor-androstadien-3$\beta$-ol-17-one.

Example XI

The foregoing compound was treated with methyl, ethyl and vinyl magnesium bromide, to produce respectively: 6,17$\alpha$ - dimethyl - $\Delta^{1(10),5}$-19-nor-androstadiene-3$\beta$, 17$\beta$ - diol, 6 - methyl-17$\alpha$-ethyl-$\Delta^{1(10),5}$-19-nor-androstadiene - 3$\beta$,17$\beta$ - diol, and 6-methyl-17$\alpha$-vinyl-$\Delta^{1(10),5}$-19-nor-androstadiene-3$\beta$,17$\beta$-diol.

Example XII

A solution of 1 g. of 6-methyl-$\Delta^{1(10),5}$-19-nor-androstadien-3$\beta$-ol-17-one in 50 cc. of anhydrous benzene was added under nitrogen atmosphere to a solution prepared by dissolving 1.4 g. of potassium in 30 cc. of t-amyl-alcohol. A slow stream of purified acetylene was passed through the solution for 40 hours, after which the solution was diluted with water and extracted with benzene. The organic extract was washed to neutral, dried over anhydrous sodium sulfate and evaporated to dryness under reduced pressure. The residue was chromatographed on 50 g. of neutral alumina, to produce 6-methyl-17$\alpha$-ethinyl-$\Delta^{1(10),5}$-19-nor-androstadiene-3$\beta$,17$\beta$-diol.

Example XIII

By following the method described in the preceding example, 1 g. of 3-acetoxy-17-ethylenedioxy-$\Delta^{5(10)}$-19-nor-androsten-6-one was converted into 17-ethylenedioxy-6-ethinyl-$\Delta^{5(10)}$-19-nor-androstene-3$\beta$,6-diol.

The foregoing compound was treated with hydrochloric acid in dioxane solution, in accordance with the method described in Example X, to produce 6-ethinyl-$\Delta^{1(10),5}$-19-nor-androstadien-3$\beta$-ol-17-one.

Example XIV

Example X was repeated but using ethyl, vinyl and propargyl magnesium bromide, thus producing as final products 6-ethyl-$\Delta^{1(10),5}$-19-nor-androstadien-3$\beta$-ol-17-one, 6 - vinyl - $\Delta^{1(10),5}$-19-nor-androstadien-3$\beta$-ol-17-one and 6-propargyl-$\Delta^{1(10),5}$-19-nor-androstadien-3$\beta$-ol-17-one.

Example XV

In accordance with method described in Example III, the compounds below mentioned (I) were treated with the indicated Grignard reagents, to produce the respective 17$\alpha$-substituted derivatives:

| I | Reagent | II |
| --- | --- | --- |
| 6-ethinyl-$\Delta^{1(10),5}$-19-nor-androstadien-3$\beta$-ol-17-one | Methyl magnesium bromide | 6-ethinyl-17$\alpha$-methyl-$\Delta^{1(10),5}$-19-nor-androstadiene-3$\beta$,17$\beta$-diol. |
| 6-ethyl-$\Delta^{1(10),5}$-19-nor-androstadien-3$\beta$-ol-17-one | Vinyl-magnesium bromide | 6-ethyl-17$\alpha$-vinyl-$\Delta^{1(10),5}$-19-nor-androstadiene-3$\beta$,17$\beta$-diol. |
| 6-vinyl-$\Delta^{1(10),5}$-19 nor-androstadien-3$\beta$-ol-17-one | Ethyl-magnesium bromide | 6-viny -17$\alpha$-ethyl-$\Delta^{1(10),5}$-19-nor-androstadiene-3$\beta$,17$\beta$-diol. |
| 6-propargyl-$\Delta^{1(10),5}$-19-nor-androstadien-3$\beta$-ol-17-one | Methyl magnesium bromide | 6-propargyl-17$\alpha$-methyl-$\Delta^{1(10),5}$-19-nor-androstadiene-3$\beta$,17$\beta$-diol. |
| 6-ethinyl-$\Delta^{1(10),5}$-19-nor-androstadien-3$\beta$-ol-17-one | Ethinyl magnesium bromide | 6,17$\alpha$-diethinyl-$\Delta^{1(10),5}$-19-nor-androstadiene-3$\beta$,17$\beta$-diol. |

Example XVI

To a solution of 2 g. of 6-methyl-$\Delta^{1(10),5}$-19-nor-androstadien-3$\beta$-ol-17-one in 100 cc. of methanol there was added 1 g. of sodium borohydride dissolved in 4 cc. of water. The mixture was kept at room temperature overnight, the excess of reagent was decomposed by the addition of acetic acid, and the resulting solution was concentrated to a small volume under vacuo and diluted with water. The product was extracted with ethyl acetate, the extract was washed with water, dried and evaporated to dryness. Crystallization of the residue from acetonehexane gave 6-methyl-$\Delta^{1(10),5}$-19-nor-androstadiene-3$\beta$,17$\beta$-diol.

In the same manner, starting from the respective 17-keto compounds there were obtained 6-ethinyl-$\Delta^{1(10),5}$-19 - nor-androstadiene-3$\beta$,17$\beta$-diol, 6-ethyl-$\Delta^{1(10),5}$-19-nor-androstadiene-3$\beta$,17$\beta$-diol, 6-vinyl-$\Delta^{1(10),5}$-19-nor-androstadiene-3$\beta$,17$\beta$ - diol and 6-propargyl-$\Delta^{1(10),5}$-19-nor-androstadiene-3$\beta$,17$\beta$-diol.

Example XVII

A mixture of 1 g. of 6-methyl-$\Delta^{1(10),5}$-19-nor-androstadiene-3$\beta$,17$\beta$-diol, 4 cc. of pyridine and 4 cc. of acetic anhydride was allowed to stand at room temperature overnight, poured into water and the formed precipitate collected by filtration; crystallization from acetone-ether gave the diacetate of 6-methyl-$\Delta^{1(10),5}$-19-nor-androstadiene-3$\beta$,17$\beta$-diol in pure form.

By the same method, 6-ethinyl-$\Delta^{1(10),5}$-19-nor-androstadiene - 3$\beta$,17$\beta$ - diol, 6-vinyl-$\Delta^{1(10),5}$-19-nor-androstadiene-3$\beta$,17$\beta$ - diol, 6-ethyl-$\Delta^{1(10),5}$-19-nor-androstadien-3$\beta$,17$\beta$-diol, and $\Delta^{1(10),5}$-19-nor-androstadiene-3$\beta$,17$\beta$-diol were converted into the respective diacetates.

Example XVIII

In accordance with the method described in the preceding example, the compounds below mentioned (I) were esterified with the indicated acid anhydride, to produce the corresponding diesters or monoesters (II).

| I | Anhydride | II |
| --- | --- | --- |
| $\Delta^{1(10),5}$-19-nor-androstadiene-3$\beta$,17$\beta$-diol | Propionic | Dipropionate of $\Delta^{1(10),5}$-19-nor-androstadiene-3$\beta$,17$\beta$-diol. |
| 6-methyl-$\Delta^{1(10),5}$-19-nor-androstadiene-3$\beta$,17$\beta$-diol | Caproic | Dicaproate of 6-methyl-$\Delta^{1(10),5}$-19-nor-androstadiene-3$\beta$,17$\beta$-diol. |
| 6-ethyl-$\Delta^{1(10),5}$-19-nor-androstadiene-3$\beta$,17$\beta$-diol | Enanthic | Dienanthate of 6-ethyl-$\Delta^{1(10),5}$-19-nor-androstadiene-3$\beta$,17$\beta$-diol. |
| 6-vinyl-$\Delta^{1(10),5}$-19-nor-androstadiene-3$\beta$,17$\beta$-diol | Undecenoic | Diundecenoate of 6-vinyl-$\Delta^{1(10),5}$-19-nor-androstadiene-3$\beta$,17$\beta$-diol. |
| 6-ethinyl-$\Delta^{1(10),5}$-19-nor-androstadiene-3$\beta$,17$\beta$-diol | Cyclopentyl-propionic | Dicyclopentylpropionate of 6-ethinyl-$\Delta^{1(10),5}$-19-nor-androstadiene-3$\beta$,17$\beta$-diol. |
| 6-propargyl-$\Delta^{1(10),5}$-19-nor-androstadiene-3$\beta$,17$\beta$-diol | Caproic | Dicaproate of propargyl-$\Delta^{1(10),5}$-19-nor-androstadiene-3$\beta$,7$\beta$-diol. |
| $\Delta^{1(10),5}$-19-nor-androstadien-3$\beta$-ol-17-one | Caproic | Caproate of $\Delta^{1(10),5}$-19-nor-androstadien-3$\beta$-ol-17-one. |
| 6-methyl-$\Delta^{1(10),5}$-19-nor-androstadien-3$\beta$-ol-17-one | Propionic | Propionate of 6-methyl-$\Delta^{1(10),5}$-19-nor-androstadien-3$\beta$-ol-17-one. |
| 6-ethinyl-$\Delta^{1(10),5}$-19-nor-androstadien-3$\beta$-ol-17-one | Acetic | Acetate of 6-ethinyl-$\Delta^{1(10),5}$-19-nor-androstadien-3$\beta$-ol-17-one. |
| 6-ethyl-$\Delta^{1(10),5}$-19-nor-androstadien-3$\beta$-ol-17-one | Cyclopentyl propionic | Cyclopentylpropionate of 6-ethyl-$\Delta^{1(10),5}$-19-nor-androstadien-3$\beta$-ol-17-one. |
| 6-vinyl-$\Delta^{1(10),5}$-19-nor-androstadien-3$\beta$-ol-17-one | Enanthic | Enanthate of 6-vinyl-$\Delta^{1(10),5}$-19-nor-androstadien-3$\beta$-ol-17-one. |
| 6-propargyl-$\Delta^{1(10),5}$-19-nor-androstadien-3$\beta$-ol-17-one | Acetic | Acetate of 6-propargyl-$\Delta^{1(10),5}$-19-nor-androstadien-3$\beta$-ol-17-one. |

Example XIX

In accordance with the method described in Example II, 17α - methyl-$\Delta^{1(10),5}$-19-nor-androstadiene-3β,17β-diol, 6,17α - dimethyl-$\Delta^{1(10),5}$-19-nor-androstadiene-3β,17β-diol, 17α - ethyl-$\Delta^{1(10),5}$-19-nor-androstadiene-3β,17β-diol, 17α-vinyl-$\Delta^{1(10),5}$-19-nor-androstadiene-3β,17β-diol, 17α-ethinyl-$\Delta^{1(10),5}$-19-nor-androstadiene-3β,17β-diol, 6-methyl-17α-vinyl-$\Delta^{1(10),5}$-19-nor-androstadiene-3β,17β-diol, 6-methyl-17α-ethinyl-$\Delta^{1(10),5}$-19-nor-androstadiene-3β,17β-diol, and 6,17α - diethinyl-$\Delta^{1(10),5}$-19-nor-androstadiene-3β,17β-diol were treated with acetic anhydride in pyridine, to produce the corresponding 3-monoacetates.

Example XX

To a solution of 1 g. of 17α-methyl-$\Delta^{1(10),5}$-19-nor-androstadiene-3β,17β-diol in 40 cc. of anhydrous benzene there were added 200 mg. of p-toluenesulfonic acid and 4 cc. of acetic anhydride, and the mixture was kept at room temperature for 24 hours. It was then poured into ice water and the resulting mixture stirred to effect hydrolysis of the excess anhydride. The benzene layer was separated and washed with 10% sodium carbonate solution and water. Drying, evaporation and crystallization of the residue from ether hexane gave the diacetate of 17α-methyl-$\Delta^{1(10),5}$-19-nor-androstadiene-3β,17β-diol.

Example XXI

In accordance with the method described in the foregoing example but using propionic, caproic and enanthic anhydrides as esterifying agents, there were obtained the dipropionate, dicaproate and dienanthate of 17α-methyl-$\Delta^{1(10),5}$-19-nor-androstadiene-3β,17β-diol.

Example XXII

By following the method of Example XX, the compounds below mentioned (I) were esterified with the indicated acid anhydride, to produce the compounds under (II).

Example XXIII

To a solution of 2 g. of the diacetate of 17α-methyl-$\Delta^{1(10),5}$-19-nor-androstadiene-3β,17β-diol in 100 cc. of methanol there was added 500 mg. of potassium carbonate dissolved in 10 cc. of water and the mixture was allowed to stand for 1 hour at 0° C., neutralized with acetic acid and the methanol was distilled under reduced pressure. The residue was triturated with water, the solid was filtered off, washed with water, dried and recrystallized from ethyl-acetate-methanol, thus producing the 17-monoacetate of 17α- methyl-$\Delta^{1(10),5}$-19-nor-androstadiene-3β, 17β-diol.

Example XXIV

By following the method described in Example I, 2 gr. of 3 - acetoxy - 20-ethylenedioxy-$\Delta^{5(10)}$-19-nor-pregnen-6-one were reduced with lithium aluminum hydride in tetrahydrofuran solution, to produce 20-ethylenedioxy-$\Delta^{5(10)}$-19-nor-pregnene-3β,6-diol (mixture of 6α and 6β-isomers), which upon treatment with aqueous acetic acid gave $\Delta^{1(10),5}$-19-nor-pregnadien-3β-ol-20-one.

In the same manner, the compounds below mentioned (I) were converted successively into the 3β,6-dihydroxy compounds (II) and $\Delta^{1(10),5}$-19-nor-pregnadienes (III).

| I | II | III |
|---|---|---|
| 16α-methyl-3-acetoxy-20-ethylenedioxy-$\Delta^{5(10)}$-19-nor-pregnen 6-one. | 16α-methyl-20-ethylenedioxy-$\Delta^{5(10)}$-19-nor-pregnene-3β,6-diol. | 16α-methyl-$\Delta^{1(10),5}$-19-nor-pregnadien-3β-ol-20-one. |
| 16α,17α-isopropylidenedioxy-3-acetoxy-20-ethylenedioxy-$\Delta^{5(10)}$-19-nor-pregnen-6-one. | 16α,17α-isopropylidenedioxy-20-ethylenedioxy-$\Delta^{5(10)}$-19-nor-pregnene-3β,6-diol. | 16α,17α-isopropylidenedioxy-$\Delta^{1(10),5}$-19-nor-pregnadien-3β-ol-20-one. |
| 3,17-diacetoxy-20-ethylenedioxy-$\Delta^{5(10)}$-19-nor-pregnen-6-one. | 20-ethylenedioxy $\Delta^{5(10)}$-19-nor-pregnene-3β,6,17α-triol. | $\Delta^{1(10),5}$-19-nor-pregnadiene-3β,17α-diol-20-one. |
| Acetate of 17,20;20,21-bismethylenedioxy-$\Delta^{5(10)}$-19-nor-pregnen-3β-ol-6-one. | 17,20;20,21-bismethylenedioxy-$\Delta^{5(10)}$-19-nor-pregnene-3β,6-diol. | 17,20;20,21-bismethylenedioxy-$\Delta^{1(10),5}$-19-nor-pregnadien-3β-ol. |
| Acetate of 17,20;20,21-bismethylenedioxy-$\Delta^{5(10)}$-19-nor-pregnen-3β-ol-6,11-dione. | 17,20;20,21-bismethylenedioxy-$\Delta^{5(10)}$-19-nor-pregnene-3β,6,11β-triol. | 17,20;20,21-bismethylenedioxy-$\Delta^{1(10),5}$-19-nor-pregnadiene-3β,11β-diol. |
| Acetate of $\Delta^{5(10)}$-19-nor-22-isospirosten-3β-ol-6-one. | $\Delta^{5(10)}$-19-nor-22-isospirosten-3β,6-diol. | $\Delta^{1(10),5}$-19-nor-22-isospirostadiene-3β-ol. |

Example XXV

In accordance with the method described in Example IX, 1 g. of 3-acetoxy-20-ethylenedioxy-$\Delta^{5(10)}$-19-nor-pregnen-6-one was treated with methyl magnesium bromide and the 6-methyl-20-ethylenedioxy-$\Delta^{5(10)}$-19-nor-pregnene-3β,6-diol thus obtained was reacted with hydrochloric acid in dioxane solution, by following the method of Example X, to produce 6-methyl-$\Delta^{1(10),5}$-19-nor-pregnadien-3β-ol-20-one.

In the same manner but using the acetate of 17,20;20, 21-bismethylenedioxy-$\Delta^{5(10)}$-19-nor-pregnen-3β-ol-6 - one as starting material, there were obtained 6-methyl-17,20; 20,21-bismethylenedioxy - $\Delta^{5(10)}$ - 19 - nor-pregnene-3β,6-diol and 6-methyl-17,20;20,21-bismethylenedioxy-$\Delta^{1(10),5}$-19-nor-pregnadien-3β-ol.

| I | Anhydride | II |
|---|---|---|
| 6,17α-dimethyl-$\Delta^{1(10),5}$-19-nor-androstadiene-3β,17β-diol. | Caproic | Dicaproate of 6,17α-dimethyl-$\Delta^{1(10),5}$-19-nor-androstadiene-3β,17β-diol. |
| 17α-vinyl-$\Delta^{1(10),5}$-19-nor-androstadiene-3β,17β-diol. | Propionic | Dipropionate of 17α-vinyl-$\Delta^{1(10),5}$-19-nor-androstadiene-3β,17β-diol. |
| 17α-ethinyl-$\Delta^{1(10),5}$-19-nor-androstadiene-3β,17β-diol. | Acetic | Diacetate of 17α-ethinyl-$\Delta^{1(10),5}$-19-nor-androstadiene-3β,17β-diol. |
| 3-acetate of 6-methyl-17α-vinyl-$\Delta^{1(10),5}$-19-nor-androstadiene-3β,17β-diol. | Propionic | 3-acetate-17-propionate of 6-methyl-17α-vinyl-$\Delta^{1(10),5}$-19-nor-androstadiene-3β,17β-diol. |
| 3-acetate of 6-methyl-17α-ethinyl-$\Delta^{1(10),5}$-19-nor-androstadiene-3β,17β-diol. | Cyclopentylpropionic | 3-acetate-17-cyclopentylpropionate of 6-methyl-17α-ethinyl-$\Delta^{1(10),5}$-19-nor-androstadiene-3β,17β-diol. |
| 3-acetate of 6,17α-diethinyl-$\Delta^{1(10),5}$-19-nor-androstadiene-3β,17β-diol. | Enanthic | 3-acetate 17-enanthate of 6,17α-diethinyl-$\Delta^{1(10),5}$-19-nor-androstadiene-3β,17β-diol. |

We claim:
1. A compound of the following formula:

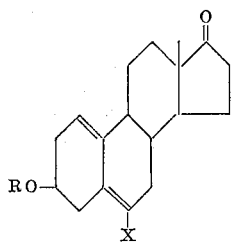

wherein R is selected from the group consisting of hydrogen and an acyl radical of less than 12 carbon atoms and X is selected from the group consisting of hydrogen, lower alkyl, lower alkenyl and lower alkinyl.

2. $\Delta^{1(10),5}$-19-nor-androstadien-3$\beta$-ol-17-one.
3. 6-methyl-$\Delta^{1(10),5}$-19-nor-androstadien-3$\beta$-ol-17-one.
4. 6-vinyl-$\Delta^{1(10),5}$-19-nor-androstadien-3$\beta$-ol-17-one.
5. 6-ethinyl-$\Delta^{1(10),5}$-19-nor-androstadien-3$\beta$-ol-17-one.
6. A compound of the following formula:

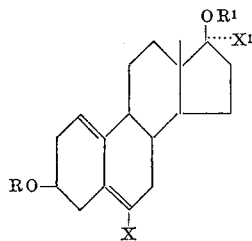

wherein R and R$^1$ are selected from the group consisting of hydrogen and an acyl radical of less than 12 carbon atoms; and X and X$^1$ are selected from the group consisting of hydrogen, lower alkyl, lower alkenyl and lower alkinyl radicals.

7. $\Delta^{1(10),5}$-19-nor-androstadiene-3$\beta$,17$\beta$-diol.
8. 17$\alpha$ - methyl - $\Delta^{1(10),5}$ - 19 - nor - androstadiene-3$\beta$,17$\beta$-diol.
9. 17$\alpha$ - vinyl - $\Delta^{1(10),5}$ - 19 - nor - androstadiene-3$\beta$,17$\beta$-diol.
10. 17$\alpha$ - ethinyl - $\Delta^{1(10),5}$ - 19 - nor - androstadiene-3$\beta$,17$\beta$-diol.
11. 6 - methyl - $\Delta^{1(10),5}$ - 19 - nor - androstadiene-3$\beta$,17$\beta$-diol.
12. 6,17$\alpha$ - dimethyl - $\Delta^{1(10),5}$ - 19 - nor - androstadiene-3$\beta$,17$\beta$-diol.
13. 6 - methyl - 17$\alpha$ - vinyl - $\Delta^{1(10),5}$ - 19 - nor - androstadiene-3$\beta$,17$\beta$-diol.
14. 6 - methyl - 17$\alpha$ - ethinyl - $\Delta^{1(10),5}$ - 19 - androstadiene-3$\beta$,17$\beta$-diol.
15. 6 - vinyl - $\Delta^{1(10),5}$ - 19 - nor - androstadiene-3$\beta$,17$\beta$-diol.
16. 6 - ethinyl - $\Delta^{1(10),5}$ - 19 - nor - androstadiene-3$\beta$,17$\beta$-diol.

17. In the process for producing 3$\beta$-hydroxy-$\Delta^{1(10),5}$-19-nor steroids selected from the group consisting of the androstane, pregnane and sapogenin series, the step which comprises treating a 3$\beta$,6-dihydroxy-$\Delta^{5(10)}$-19-nor compound selected from the group consisting of the androstane, pregnane and sapogenin series with a proton donor.

18. The process in accordance with claim 17 wherein the proton donor is 50% aqueous acetic acid.
19. The process in accordance with claim 17 wherein the proton donor is a strong mineral acid in an inert organic solvent.
20. The process in accordance with claim 19 wherein the mineral acid is hydrochloric acid.
21. The process in accordance with claim 19 wherein the mineral acid is sulfuric acid.
22. The process in accordance with claim 19 wherein the mineral acid is perchloric acid.
23. The process in accordance with claim 17 wherein the proton donor is p-toluenesulfonic acid.
24. The process in accordance with claim 19 wherein the inert solvent is an ether solvent.

References Cited by the Examiner

Iriarte et al.: J. Amer. Chem. Soc., 81, pp. 436–438 (1959).
Fishman: J. Org. Chem., 28, pp. 1528–1530 (1963).

LEWIS GOTTS, *Primary Examiner.*